Figure 1:
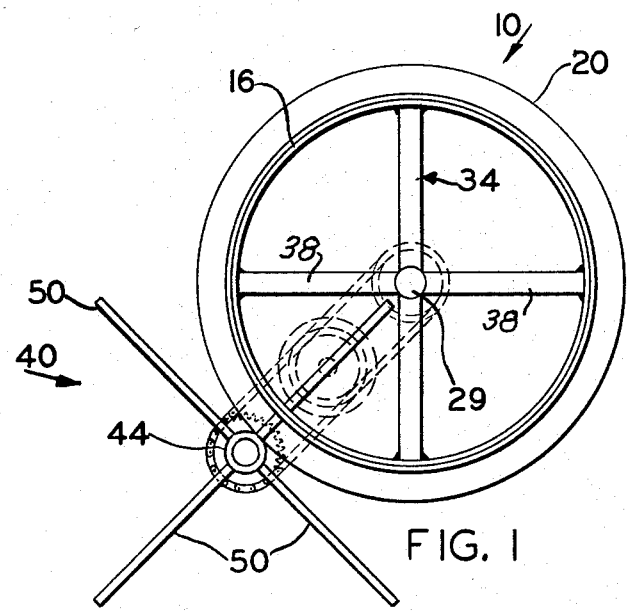

INVENTOR.
MORRIS D. ISSERLIS 3,279,655
MATERIAL DISPENSING APPARATUS
Morris D. Isserlis, 29 Washington Ave.,
North Plainfield, N.J.
Filed Mar. 30, 1965, Ser. No. 443,884
8 Claims. (Cl. 222—168)

My invention relates to apparatus for storing bulk volumes of different types of materials and dispensing quantities thereof uniformly and at a controlled rate.

Some of the materials which are used in various industries and which must be stored and dispensed during manufacture include sticky material, lumpy material, cakelike materials, crystalline materials, damp or dry materials, fine powders such as clay, pigments, talc, or the like, and materials of the nature of wood chips and matted fibers.

Many types of apparatus are known for feeding or dispensing these different types of materials. Generally, these types of apparatus operate satisfactorily with various ones of the aforementioned types of materials. However, no apparatus has been found which is completely satisfactory for feeding or dispensing substantially all of the different types of materials.

Accordingly, the objects of the invention concern the provision of improved apparatus which is suitable for storing and dispensing a wide variety of materials, including some which could not be fed satisfactorily by apparatus in the prior art.

Briefly, apparatus embodying the principles of the invention includes an open-ended, upright bin, beneath which is positioned a generally circular table. The table preferably is spaced from the lower end of the bin and may be somewhat larger than that of the bin. The table and bin are arranged to rotate together. A rotatable plow is positioned between the table and the lower end of the bin near the edge of the table, and the plow is adapted to operate in conjunction with the rotating bin and table to facilitate the dispensing of material from the bin.

Figure 2:
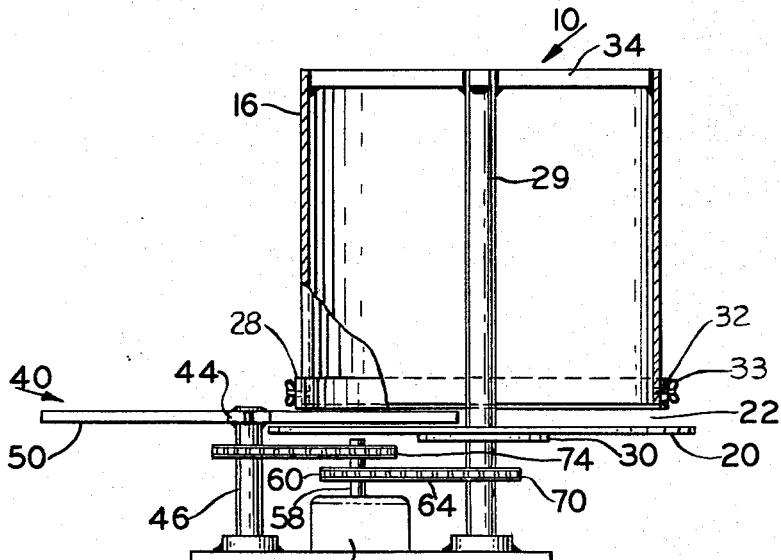

My invention is described in greater detail by reference to the drawing, wherein:

FIG. 1 is a side elevational view, partly in section, of apparatus embodying the invention; and FIG. 2 is a plan view of the apparatus of FIG. 1.

The dispensing apparatus of the invention 10 includes an open-ended, generally cylindrical bin 16 which is adapted to receive material in bulk and dispense relatively small quantities thereof. The bin 16 is positioned with its axis oriented vertically.

A generally circular horizontal receiving plate or table 20 is located adjacent to and spaced from the lower end of the cylindrical bin 16, said table 20 preferably having a diameter greater than that of the bin. The vertical axis of the bin is aligned with the center of the table. The table 20 is spaced from the bin as shown at 22 in FIG. 1 to permit egress of the material to be moved from inside the bin. The space 22 may be increased or decreased, depending on the composition of the material being moved. The tackiness or viscosity of the material and the required rate of discharge are factors used in determining the adjustment of said space 22. Said adjustment is accomplished in one suitable arrangement, by raising or lowering a circumferential slideable adjustment band 28, which is secured to the outer surface of bin 16 in any suitable manner, for example, by means of a plurality of vertical slots 32 through which nuts and bolts 33 operate.

In operation of the apparatus 10, the bin 16 and table 20 are rotated in synchronism. Accordingly, in the preferred arrangement, the bin and table are secured together. In one suitable arrangement for securing the bin and table together, a central vertical shaft 29 is provided oriented on the axis of the bin. The shaft 29 carries a horizontal sleeve or plate 30 which is secured to the under surface of table 20 by welding or the like. In addition, at its upper end which is near the upper open end of the bin, the shaft 29 carries a spider 34 which includes a plurality of radiating arms 38 which are secured to the bin in any suitable fashion, for example, by welding. If desired, a second similar spider (not shown) may be secured between the shaft and the bin at another location on the shaft to provide strength. Thus, the bin 16 and the table 20 are secured together by means of the shaft 29 and the associated parts. The space 22 between the lower end of the bin and the top surface of the table is the space from which material is fed by the apparatus 10.

The feeder 10 of the invention also includes a rotatable plow 40 which includes a hub 44 and shaft 46 from which a plurality of vanes or arms 50 extend radially. The plow 40 is oriented horizontally in the space 22 between the lower end of the bin 16 and the top surface of the table 20 with its hub near the edge of the table. The vanes of the plow lie in a common plane, and they are of sufficient length so that they extend a considerable distance toward the axis of the bin and the center of the table.

In addition, means are provided for separately rotating the combination of bin and table, and the plow. In one suitable arrangement, a single motor 54 may be used for this purpose. Such a motor includes a rotatable shaft 58 which carries one pulley or gear 60 coupled through a belt or the like 64 to a pulley or gear 70 secured to the shaft 29. This arrangement rotates the bin and table. The motor shaft 58 also carries a pulley or gear combination 74 which is coupled to the shaft 46 and rotates the plow. The plow may rotate in the same direction as the bin or table, or it may rotate in the opposite direction.

The apparatus of the invention which includes rotatable bin, table, and plow provides efficient storing and feeding of a wide variety of materials from the space between the bin and the table.

It is clear that support means for the various components of apparatus 10, although they are not shown, are provided as required.

What I claim is:
1. Material feeding apparatus comprising
    a generally cylindrical open-ended bin oriented vertically and adapted for storing and feeding materials of different types,
    a horizontal table positioned beneath the lower open end of said bin,
    said bin and said table being rotatable, and
    auxiliary rotary means positioned between said bin and said table for facilitating the feeding of material out of the space between said bin and said table,
    said auxiliary rotary means extending from approximately the periphery of said table to about the center thereof and thereby overlying the active material-feed area of said table, the dispensing of material thus being controlled by the interaction of the bin, the table, and the rotary means.
2. The apparatus defined in claim 1 wherein said bin and said table are mounted to rotate in the same direction.
3. The apparatus defined in claim 1 wherein said bin and said table are mounted to rotate in synchronism.
4. The apparatus defined in claim 1 wherein said bin and said table are secured together to that they rotate together.
5. The apparatus defined in claim 1 wherein said auxiliary rotary means comprises a plow including a plurality of arms for engaging and feeding material.

6. The apparatus defined in claim 1 wherein said auxiliary rotary means comprises a plow including a plurality of arms for engaging and feeding material, the arms of said plow being positioned between said table and the lower end of said bin.

7. The apparatus defined in claim 1 wherein said auxiliary rotary means comprises a plow including a plurality of arms for engaging and feeding material, the arms of said plow lying in a horizontal plane and extending inwardly from the edge of the table toward the center of the table.

8. Material feeding apparatus comprising
 a generally cylindrical bin oriented vertically and having an open upper end for receiving material and an open lower end for discharging material,
 a horizontal table positioned beneath and spaced from the lower open end of said bin with the center of the table being aligned with the vertical axis of said bin,
 said bin and said table being rotatable, and
 auxiliary rotary means positioned between said bin and said table for facilitating the feeding of material out of the space between said bin and said table,
 said auxiliary rotary means comprising a plow including a central hub and a plurality of arms radiating from the hub, the hub being positioned near the edge of the table with the arms lying in a common plane and extending inwardly from the edge of the table and terminating at about the center of the table between the table and the lower open end of the bin, the dispensing of material thus being controlled by the interaction of the bin, the table, and the rotary means.

References Cited by the Examiner

UNITED STATES PATENTS

| | | | |
|---|---|---|---|
| 2,896,824 | 7/1959 | Sheldon | 222—168 |
| 3,100,584 | 8/1963 | Bauder | 222—302 X |

ROBERT B. REEVES, *Primary Examiner.*

HADD S. LANE, *Examiner.*